US012681132B2

(12) United States Patent
Wan

(10) Patent No.: US 12,681,132 B2
(45) Date of Patent: Jul. 14, 2026

(54) DEVICE IDENTIFICATION METHOD AND APPARATUS, ELECTRONIC DEVICE AND READABLE STORAGE MEDIUM

(71) Applicant: Luxshare Precision Industry Company Limited, Shenzhen (CN)

(72) Inventor: Shih-Wei Wan, Shenzhen (CN)

(73) Assignee: LUXSHARE PRECISION INDUSTRY COMPANY LIMITED, Shenzhen (CN)

( * ) Notice: Subject to any disclaimer, the term of this patent is extended or adjusted under 35 U.S.C. 154(b) by 344 days.

(21) Appl. No.: 18/387,931

(22) Filed: Nov. 8, 2023

(65) Prior Publication Data

US 2024/0241211 A1 Jul. 18, 2024

(30) Foreign Application Priority Data

Nov. 8, 2022 (CN) .......................... 202211394334.2

(51) Int. Cl.
| | |
|---|---|
| *G01S 5/02* | (2010.01) |
| *G01C 19/5776* | (2012.01) |
| *G06V 10/75* | (2022.01) |

(52) U.S. Cl.
CPC ........ *G01S 5/0295* (2020.05); *G01C 19/5776* (2013.01); *G06V 10/751* (2022.01)

(58) Field of Classification Search
CPC G01C 19/5776; G01S 5/0295; G06V 10/751; H04L 67/12; H04L 67/303
See application file for complete search history.

(56) References Cited

U.S. PATENT DOCUMENTS

| | | | |
|---|---|---|---|
| 12,219,000 B1 * | 2/2025 | Firoozye | ................. H04L 65/70 |
| 2023/0123453 A1 * | 4/2023 | Swanson | .............. G09F 3/0297 |
| | | | 358/1.13 |
| 2023/0252703 A1 * | 8/2023 | Swanson | .............. B42D 15/025 |
| | | | 715/202 |
| 2023/0316846 A1 * | 10/2023 | Zhou | ....................... G07F 9/002 |
| | | | 700/236 |

* cited by examiner

*Primary Examiner* — Timothy X Pham
(74) *Attorney, Agent, or Firm* — Birch, Stewart, Kolasch & Birch, LLP

(57) ABSTRACT

Disclosed are a device identification method and apparatus, an electronic device and a readable storage medium. The device identification method includes steps: receiving an identification instruction, and acquiring device characteristic information corresponding to the identification instruction; determining a target device corresponding to the device characteristic information among connected devices; and sending an indication signal corresponding to the target device to the target device, so as to enable the target device to execute an indication operation corresponding to the indication signal.

18 Claims, 2 Drawing Sheets

Receive an identification instruction, and acquire device characteristic information corresponding to the identification instruction — S10

Determine a target device corresponding to the device characteristic information among connected devices — S20

Send an indication signal corresponding to the target device to the target device — S30

DEVICE IDENTIFICATION METHOD AND APPARATUS, ELECTRONIC DEVICE AND READABLE STORAGE MEDIUM

CROSS REFERENCE TO RELATED APPLICATIONS

The present disclosure claims all rights and interests to Utility Patent Application No. 202211394334.2, entitled "Device Identification Method and Apparatus, Electronic Device and Readable Storage Medium", filed to the China National Intellectual Property Administration on Nov. 8, 2022, and the entire content of which is incorporated herein by reference.

TECHNICAL FIELD

The present disclosure generally relates to the field of device control, in particular to a device identification method and apparatus, an electronic device and a readable storage medium.

BACKGROUND

In the related art, identifiers, such as QR codes are often set on devices. When users need to identify what the devices are, device information is acquired by scanning the QR codes, and the devices are identified based on the device information. However, this identification mode requires scanning the QR codes at a close range, and when the users are on sides of the devices without the QR codes set, the devices cannot be identified. At the same time, when a plurality of devices need to be identified, the QR codes on the devices need to be scanned in sequence, which is not convenient for the users to use.

SUMMARY

The present disclosure provides a device identification method and apparatus, an electronic device and a readable storage medium, aiming to solve the technical problem of insufficiently convenient device identification modes in the prior art.

In order to solve the above technical problem or at least partially solve the above technical problem, the present disclosure provides a device identification method, including the steps:

receiving an identification instruction, and acquiring device characteristic information corresponding to the identification instruction;

determining a target device corresponding to the device characteristic information among connected devices; and sending an indication signal corresponding to the target device to the target device, so as to enable the target device to execute an indication operation corresponding to the indication signal.

In some embodiments, the step of receiving the identification instruction, and acquiring the device characteristic information corresponding to the identification instruction includes:

receiving the identification instruction, and acquiring a device image of the target device according to the identification instruction; and identifying the device image to obtain the device characteristic information.

In some embodiments, the step of sending the indication signal corresponding to the target device to the target device includes:

judging whether one or a plurality of target devices are provided;

generating, in a case that the plurality of target devices are provided, an indication signal corresponding to each target device, wherein different indication signals correspond to different indication operations; and sending the indication signals to the corresponding target devices.

In some embodiments, after the step of sending the indication signals to the corresponding target devices, the method includes:

acquiring a real-time image of each target device, and executing an indication identifying operation on the real-time image;

matching, in a case that the indication identifying operation identifies the indication operation, a current device corresponding to the indication operation among the target devices; and acquiring unique identification information of the current device, and displaying the unique identification information in a display position associated with the current device.

In some embodiments, the step of generating the indication signal corresponding to each target device includes:

acquiring the number of the target devices, and acquiring displayable colors and the displayable number of display lamps on the target devices; and generating a plurality of indication signals according to the displayable colors and the displayable number, and associating the indication signals with all the target devices respectively, wherein the number of the indication signals is the same as the quantity of the target devices, and the displayable colors or the displayable number of the display lamps being different at least exists between the indication operations corresponding to any two indication signals.

In some embodiments, after the step of determining the target device corresponding to the device characteristic information among the connected devices, the method includes:

acquiring unique identification information of each target device, and displaying all pieces of unique identification information;

receiving a confirm instruction returned based on the unique identification information, and determining a designated device corresponding to the confirm instruction among the target devices; and acquiring gyroscope data and a signal intensity of the designated device, and performing a guidance operation on the designated device according to the gyroscope data and the signal intensity.

In some embodiments, the step of performing the guidance operation on the designated device according to the gyroscope data and the signal intensity includes:

determining a device moving trajectory according to the gyroscope data, and determining signal intensities corresponding to different device positions in the device moving trajectory;

determining a distance between each device position and the designated device according to the signal intensity corresponding to each device position, and determining a relative position of the designated device according to the distance between each device position and the designated device; and generating indication information according to the relative position, and displaying the indication information.

In order to achieve the above objective, the present disclosure further provides a device identification apparatus, including:

a first receiving module, configured to receive an identification instruction, and acquire device characteristic information corresponding to the identification instruction;

a first determining module, configured to determine a target device corresponding to the device characteristic information among connected devices; and a first sending module, configured to send an indication signal corresponding to the target device to the target device, so as to enable the target device to execute an indication operation corresponding to the indication signal.

In order to achieve the above objective, the present disclosure further provides an electronic device, including a memory, a processor and a computer program stored on the memory and capable of running on the processor, wherein the computer program, when executed by the processor, implements steps of the device identification method of the present disclosure.

In order to achieve the above objective, the present disclosure further provides a computer readable storage medium, storing a computer program thereupon, wherein the computer program, when executed by a processor, implements steps of the device identification method of the present disclosure.

BRIEF DESCRIPTION OF FIGURES

Accompanying drawings here are incorporated into the specification and constitute a part of the specification, showing examples consistent with the present disclosure, and are used together with the specification to explain the principle of the present disclosure.

In order to explain technical solutions of examples of the present disclosure more clearly, the accompanying drawings that need to be used in the examples will be briefly introduced below. Apparently, for those of ordinary skill in the art, on the premise of no creative labor, other accompanying drawings may also be obtained according to these accompanying drawings.

DETAILED DESCRIPTION

It should be understood that the specific examples described herein are only used to explain the present disclosure and are not used to limit the present disclosure. In order to enable those skilled in the art to better understand the solutions of the present disclosure, the technical solutions in the examples of the present disclosure will be clearly and completely described with reference to the accompanying drawings in the examples of the present disclosure. Apparently, the described examples are only a part of the examples of the present disclosure, rather than all the examples. Based on the examples of the present disclosure, all other examples obtained by those of ordinary skill in the art without creative labor should fall within the scope of protection of the present disclosure.

Figure 1:
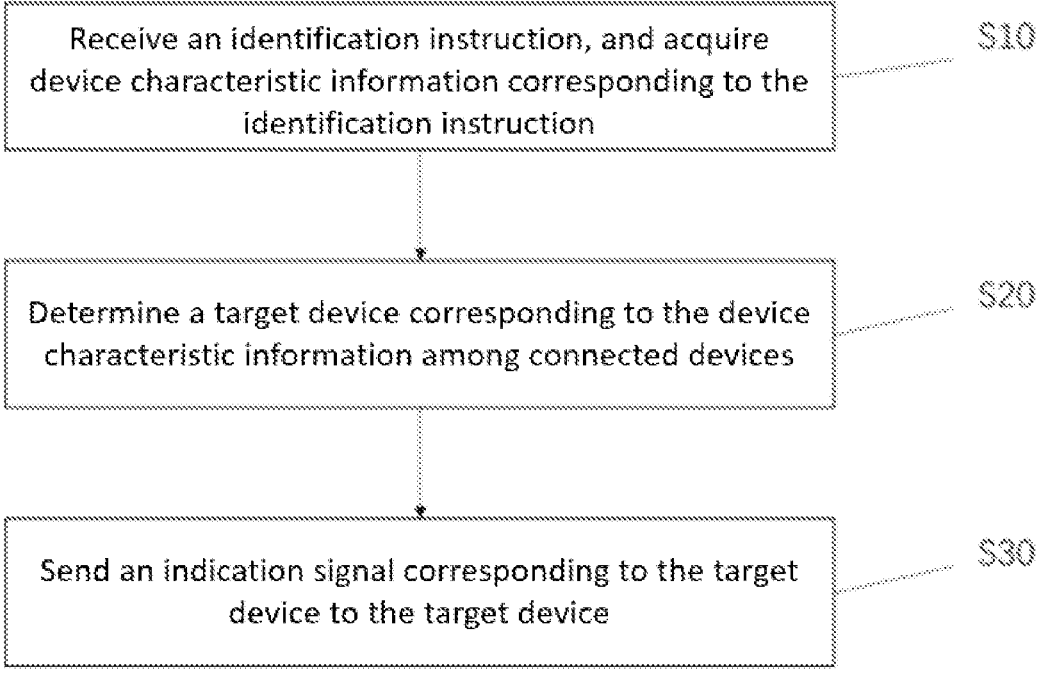
FIG. 1 is schematic flow chart of a first example of a device identification method of an example of the present disclosure.

The present disclosure provides a device identification method, applied to a device identification apparatus. The device identification apparatus may be a mobile phone, a tablet and other intelligent terminals. Referring to FIG. 1, which is a schematic flow chart of a first example of the device identification method of the present disclosure, this example and subsequent examples take the device identification apparatus being the mobile phone for illustration, and other types of device identification apparatuses may be executed analogically, which will not be repeated. The device identification method includes steps:

step S10, an identification instruction is received, and device characteristic information corresponding to the identification instruction is acquired;

step S20, a target device corresponding to the device characteristic information is determined among connected devices; and step S30, an indication signal corresponding to the target device is sent to the target device, so as to enable the target device to execute an indication operation corresponding to the indication signal.

The identification instruction is used for triggering an identification operation for the device; and a corresponding application is preinstalled in the mobile phone, or a user preinstalls the corresponding application in the mobile phone, and may trigger the identification instruction through the application; and the device characteristic information is used for representing characteristics of the target device, and includes but is not limited to the type, model, brand name, color and SSID of the target device. The device characteristic information may be preset in the application for the user to select, may be input by the user, and may further be obtained by identifying based on information such as images and voice.

The target device is a device that meets the device characteristic information among the connected devices; the mobile phone is connected with the device in advance, and a connection mode includes, but is not limited to a wired connection mode, or wireless connection modes, such as Bluetooth and wifi. After establishing a connection with the device, the mobile phone acquires relevant information of the device; and after acquiring the device characteristic information, the device of which the relevant information corresponds to the device characteristic information is matched among the connected devices, and the device is used as the target device. It needs to be noted that there may be one or a plurality of target devices.

The indication signal is used for representing a specific representation of the indication operation, and the indication operation includes a set of a single or a plurality of control instructions. After receiving the indication signal, the target device determines the indication operation corresponding to the target device and executes the indication operation, and specifically, when the indication operation is executed, the plurality of control instructions may be triggered in sequence. It needs to be noted that a plurality of indication operations may be preset in the target device, the target device determines an indication operation corresponding to the indication signal among the plurality of indication operations based on the indication signal, so as to implement a specific operation based on the control instructions contained in the indication operation. A control signal containing the control instructions may further be directly sent by a mobile phone terminal to the target device, and the target device directly executes the corresponding indication operation according to the control instructions in the control signal.

It needs to be noted that a type of the indication operation may be, but is not limited to lamplight, sound and display content of a display screen. In order to distinguish different indication operations, the indication operations may be specifically set, for example, for the lamplight, the different indication operations may be distinguished by setting the number, color or flashing of lighting lamps; for the sound, the different indication operations may be distinguished by setting different sound contents; and for the display content of the display screen, the different indication operations may be distinguished by setting different texts, patterns or videos.

In order to clear the indication operations for facilitating identification by the user, after sending the indication signal corresponding to the target device to the target device, the indication operation corresponding to the indication signal may be displayed.

This example may be applied to different device identification scenarios.

In some embodiments, when the user needs to identify an unknown target device, by acquiring the device characteristic information of the target device, the mobile phone automatically matches the target device corresponding to the device characteristic information, and enables the target device to execute the indication operation corresponding to itself, and after receiving the indication operation, the user can identify the target device correspondingly according to the indication operation.

In some embodiments, when the user needs to identify a target device that needs to be found among a plurality of similar devices, by acquiring the device characteristic information of the target device, the target device corresponding to the device characteristic information is matched, each device is enabled to execute the indication operation corresponding to itself, and the user can determine the target device that needs to be found by comparing the indication operations. Other application scenarios may be executed analogically, which will not be repeated here.

In this example, by directly acquiring the device characteristic information to determine the target device, it is not limited by the number of the devices and the orientation relative to the devices, which is convenient for the user to operate. At the same time, the indication operation is executed by the target device, so that the user can clearly identify the target device in the plurality of devices based on the indication operation.

Figure 2:
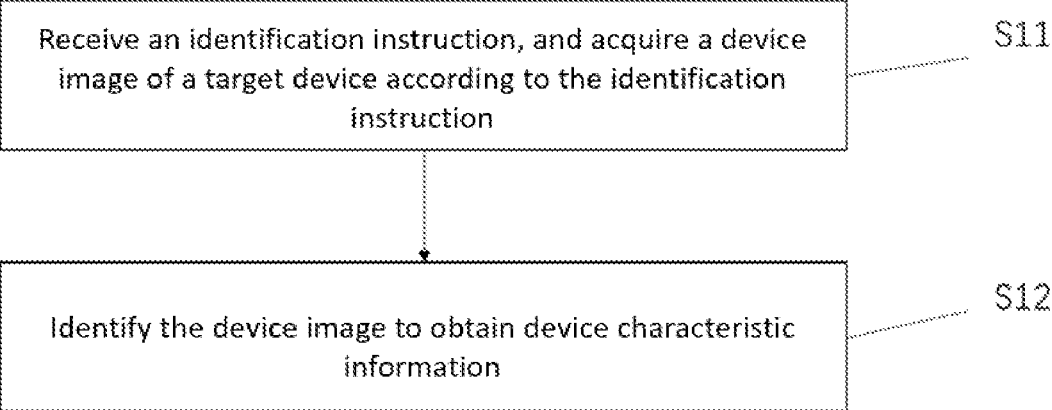
FIG. 2 is a detailed flow chart of step S10 in a second example of a device identification method of an example of the present disclosure.

In some embodiments, referring to FIG. 2, in a second example of the device identification method of the present disclosure provided based on the first example of the present disclosure, step S10 includes steps:

step S11, the identification instruction is received, and a device image of a target device is acquired according to the identification instruction; and step S12, the device image is identified to obtain the device characteristic information.

Based on different input modes of the device characteristic information, triggering modes of the identification instruction are also different, for example, when the user selects the device characteristic information in a preset application, the identification instruction is generated based on the selected device characteristic information. For another example, when the user inputs the device characteristic information, the identification instruction is generated based on the device characteristic information input by the user. For another example, when the device characteristic information needs to be obtained by identification based on information such as images or sound, an identification instruction containing an information acquiring instruction is generated, and after receiving the identification instruction, an acquiring operation of the images or sound is executed according to the information acquiring instruction in the identification instruction. In some embodiments, for the sound, it may be an existing audio input by the user, and may also be a device image collected by an image collection apparatus, such as a camera in real time.

The device image may be a picture or video. The device characteristic information of the target device contained in the device image may be obtained by identifying the device image. The specific identification method may be selected based on actual application scenarios and demands, such as a neural network, and a specific neural network training mode similarly may be selected based on the actual application scenarios and demands, such as Google TensorFlow, and YOLO (You only look once). It needs to be noted that when the device image is collected in real time, the target device in the collected device image may change based on adjustment by the user on a collection visual angle, at this time, changes of the device characteristic information obtained by the device image are identified, the indication signal is adjusted in real time based on the changed device characteristic information, so that the indication signal is matched with the latest target device, and the target device of the indication signal is received, so that the target device that receives the indication signal is matched with the target device in the device image. At this time, an original target device may be maintained to continue to execute the indication operation corresponding to itself, and may also be stopped from executing the indication operation.

It may be understood that the solution for identifying the audio information may be implemented analogical to the solution of the device image, which will not be repeated here.

In this example, the device characteristic information of the target device in the image can be identified, so that it is not necessary for the user to input or select the device characteristic information, identification efficiency is improved, and it is convenient for the user to use.

In some embodiments, in a third example of the device identification method of the present disclosure provided based on the first example of the present disclosure, step S30 includes steps:

step S31, it is judged whether one or a plurality of target devices are provided;

step S32, in a case that the plurality of target devices are provided, an indication signal corresponding to each target device is generated, wherein different indication signals correspond to different indication operations;

in a case that one target device is provided, the indication signal corresponding to the target device is generated; and step S33, the indication signals are sent to the corresponding target devices.

When there are a plurality of target devices, it is indicated that the device characteristic information of the plurality of current devices is the same, in a specific application scenario, the appearance of the plurality of target devices is the same or similar, and the user cannot distinguish the plurality of target devices through the appearance. However, the user needs to identify the device that needs to be found among the plurality of target devices or distinguish the plurality of target devices. Therefore, it is necessary to set unique indication operations for the different target devices, so that the user can distinguish the different target devices based on the indication operations. For example, step S32 includes steps:

step S321, the number of the target devices is acquired, and displayable colors and the displayable number of display lamps on the target devices are acquired; and step S322, a plurality of indication signals are generated according to the displayable colors and the displayable number, and the indication signals are associated with all the target devices respectively, wherein the number of the indication signals is the same as the number of the target devices, and the displayable colors or the displayable number of the display lamps being different at least exists between the indication operations corresponding to any two indication signals.

The number of the target devices is not unchanged, and therefore, the number of the indication signals that need to be generated each time is also different. This example takes the display lamps as an instance for illustration.

If the displayable number of the display lamps is 3, the displayable colors are 3, at this time, if the number of the target devices is less than or equal to 3, for example, specifically being 3, indication signals with different displayable numbers or colors only may be generated, for example, the displayable number of the three indication signals are 1, 2 and 3 respectively, or the displayable colors of the three indication signals are red, green and blue respectively. If the number of the target devices is greater than 3, for example, specifically being 4, indication signals that combine different displayable numbers and colors may be generated to enable the indication operations corresponding to the indication signals to be different, for example, indicator lamps lightened by four indication signals are 1 red, 2 reds, 3 reds and 1 blue respectively. It may be understood that this example only describes one application scenario, and the specific displayable numbers, displayable colors and combinations between the numbers and the colors may be set based on actual demands.

Different target devices receive different indication signals and execute different indication operations based on the indication signals, and the user may clear identities of the target devices through the indication operations. In order to further facilitate distinguishing by the user, after sending the indication signals to the corresponding target devices, an association relationship between each target device and the corresponding indication operation may be displayed, so that the user identifies the target device by comparing the association relationship.

In this example, the different indication operations are displayed for the different target devices, so that the user can identify the target device based on the different indication operations when the user cannot identify the target device through the appearance.

In some embodiments, in a fourth example of the device identification method of the present disclosure provided based on the third example of the present disclosure, after step S33, the method includes steps:

step S34, a real-time image of each target device is acquired, and an indication identifying operation is executed on the real-time image;

step S35, in a case that the indication identifying operation identifies the indication operation, a current device corresponding to the indication operation is matched among the target devices; and step S36, unique identification information of the current device is acquired, and the unique identification information is displayed in a display position associated with the current device.

The real-time image may be collected through an image collection device such as a camera; and when the real-time image is collected, the real-time image is displayed in real time.

The indication identifying operation is an operation that identifies the indication operation. It may be understood that when the indication operation is a visually sensitive operation, such as lamplight and display screen displaying, the real-time image is collected and subjected to image identification; and when the indication operation is an auditory sensitive operation, such as sound, audio information is collected and subjected to sound identification. This example takes the visually sensitive operation as an instance, and the auditory sensitive operation may be executed analogically, which will not be repeated.

It may be understood that before sending the indication signal to the target device, an association relationship between the indication operation corresponding to the indication signal and the target device has been stored, after the target device executes the indication operation corresponding to the indication signal, the indication operation executed by the target device is identified, and the target device corresponding to the identified indication operation is matched based on the stored association relationship.

When it is connected with the target device, the relevant information of the target device has been acquired. Therefore, after determining the target device, it is necessary to obtain information that can represent uniqueness of the target device to enable the user to clear the target device. In some embodiments, the unique identification information is used as the information that represents the uniqueness of the target device. It needs to be noted that the unique identification information is used for representing the uniqueness of the target device; based on different application scenarios, ranges for selecting the unique identification information are different, for example, when there are a plurality of connected target devices, and the user does not set unique information for the different target devices, identifiers preset by the devices for representing unique identities of the devices, such as unique device coding, serial numbers, and MAC addresses of the target devices, are used as the unique identification information. When the user sets unique information for the different target devices, such as device names set by the user, except for the above identifiers preset by the devices for representing the unique identities of the devices, the information set by the user may further be used as the unique identification information. It may be understood that the selection basis for the unique identification information is the information that there is a difference between the target devices.

After acquiring the unique identification information of the target device, in order to enable the user to quickly clear the identity of the target device, the unique identification information is displayed. In some embodiments, the unique identification information is displayed in the displayed real-time image; and when the target device is recognized in the real-time image, the target device is positioned in the real-time image, a position relative to the target device in the real-time image may be preset as a display position associated with the target device, such as an upper part, a lower part, a left side, a right side and a middle part of the target device. When there are the plurality of target devices in the real-time image, the unique identification information of each target device is displayed in the display position corresponding to each target device, and the user can identify the plurality of target devices at the same time through the displayed unique identification information.

In this example, the unique identification information of the target devices is displayed in the display positions associated with the target devices, so that the user can quickly and accurately identify the target devices.

In some embodiments, in a fifth example of the device identification method of the present disclosure provided based on the first example of the present disclosure, step S20 includes steps:

step S21, the unique identification information of each target device is acquired, and all pieces of unique identification information are displayed;

step S22, a confirm instruction returned based on the unique identification information is received, and a designated device corresponding to the confirm instruction is determined among the target devices; and step S23, gyroscope data and a signal intensity of the designated device are acquired, and a guidance operation is performed on the designated device according to the gyroscope data and the signal intensity.

When a specific target device, namely the designated device, is found in the plurality of target devices, if there are too many target devices, it is troublesome for the user to compare the indication operations one by one, and there may even be a situation that the user cannot know the location of the specific target device, which further affects the identification of the user. In this example, the unique identification information of each target device is displayed, the user selects the unique identification information to trigger the confirm instruction, and after receiving the confirm instruction, the designated device among the target devices is determined based on the confirm instruction.

Since the mobile phone is connected with the target device, a signal intensity of connection may be determined based on a connection mode, if it is a Bluetooth connection, the signal intensity of Bluetooth is determined, and if it is a WiFi connection, the signal intensity of WiFi is determined. The gyroscope data is used for representing a device position of the mobile phone, in conjunction with the device positions of the mobile phone at different moments and the signal intensities corresponding to the different device positions, a position relationship between the target device and the mobile phone may be determined, specifically:

step S32 includes steps:

step S231, a device moving trajectory is determined according to the gyroscope data, and signal intensities corresponding to different device positions in the device moving trajectory are determined;

step S232, a distance between each device position and the designated device is determined according to the signal intensity corresponding to each device position, and a relative position of the designated device is determined according to the distance between each device position and the designated device; and step S233, indication information is generated according to the relative position, and the indication information is displayed.

The device positions of the mobile phone at different moments may be obtained through changes of the gyroscope data; the device moving trajectory is a set of the device positions at successive different moments; and a distance relationship between different device positions and the designated device may be determined through the signal intensities corresponding to different device positions. In some embodiments, the higher the corresponding signal intensity, the closer the device position to the designated device, and the lower the corresponding signal intensity, the farther the device position to the designated device; and a relative position between the designated device and the mobile phone may be obtained based on each device position and a relative far and near relationship between each device position and the designated device.

After determining the relative position between the designated device and the mobile phone, it is necessary to guide the position of the designated device to the user; and the indication information is used for indicating the position of the designated device, and the indication information includes, but is not limited to maps, text or patterns. For example, a simplified map is generated according to the relative position, and the relative position between the device and the mobile phone is marked in the map. For another example, the indication information corresponding to a current facing direction of the mobile phone is determined according to the relative position, such as turning 30 degrees to the right, going straight, and going backwards. For another example, an indication identifier corresponding to the current facing direction of the mobile phone is determined according to the relative position, such as a right arrow and a straight arrow. The user may be guided to the position of the designated device through the indication information.

In this example, the relative position between the designated device and the mobile phone is determined, and the indication information corresponding to the relative position is displayed, so that the user can be guided to the position of the designated device, without the need for self comparison of the user, which is convenient for the user to use.

It needs to be noted that, for the sake of simple description, the above method examples are all expressed as a series of action combinations, but those of ordinary skill in the art should understand that the present disclosure is not limited by the described action sequences because according to the present disclosure, some steps may be performed in other sequences or at the same time. Secondly, those of ordinary skill in the art also should understand that the examples described in the specifications all belong to preferred examples, and involved actions and modules are not certainly necessary for the present disclosure.

According to the descriptions in the foregoing implementations, those skilled in the art may clearly learn that the method in the above examples may be implemented by virtue of software and a necessary universal hardware platform or by using hardware, but in many cases, the former is a preferred implementation. Based on such understanding, the technical solutions of the present disclosure essentially or the parts that contribute to the related art may be reflected in the form of a software product, which is stored on a storage medium (such as an ROM/RAM, a magnetic disc and an optical disc), and includes a plurality of instructions for enabling a terminal device (it may be a mobile phone, a computer, a server, a network device or the like) to execute the method described in all examples of the present disclosure.

The present disclosure further provides a device identification apparatus for implementing the above device identification method, including:

a first receiving module, configured to receive an identification instruction, and acquire device characteristic information corresponding to the identification instruction;

a first determining module, configured to determine a target device corresponding to the device characteristic information among connected devices; and a first sending module, configured to send an indication signal corresponding to the target device to the target device, so as to enable the target device to execute an indication operation corresponding to the indication signal.

According to the device identification apparatus, by directly acquiring the device characteristic information to determine the target device, it is not limited by the number of the devices and the orientation relative to the devices, which is convenient for users to operate. At the same time, the indication operation is executed by the target device, so that the users can clearly identify the target device in a plurality of devices based on the indication operation.

It needs to be noted that the first receiving module in this example may be configured to execute step S10 in the example of the present disclosure, the first determining module in this example may be configured to execute step S20 in the example of the present disclosure, and the first sending module in this example may be configured to execute step 30 in the example of the present disclosure.

In some embodiments, the first receiving module includes:

a first receiving unit, configured to receive the identification instruction, and acquire a device image of the target device according to the identification instruction; and a first identification unit, configured to identify the device image to obtain the device characteristic information.

In some embodiments, the first sending module includes:

a first judging unit, configured to judge whether one or a plurality of target devices are provided;

a first generating unit, configured to generate, in a case that the plurality of target devices are provided, an indication signal corresponding to each target device, wherein different indication signals correspond to different indication operations; and a first sending unit, configured to send the indication signals to the corresponding target devices.

In some embodiments, the first sending module further includes:

a first acquiring unit, configured to acquire a real-time image of each target device, and execute an indication identifying operation on the real-time image;

a first matching unit, configured to match, in a case that the indication identifying operation identifies the indication operation, a current device corresponding to the indication operation among the target devices; and a second acquiring unit, configured to acquire unique identification information of the current device, and display the unique identification information in a display position associated with the current device.

In some embodiments, the first generating unit includes:

a first acquiring subunit, configured to acquire the number of the target devices, and acquire displayable colors and the displayable number of display lamps on the target devices; and a first generating subunit, configured to generate a plurality of indication signals according to the displayable colors and the displayable number, and associate the indication signals with all the target devices respectively, wherein the number of the indication signals is the same as the number of the target devices, and the displayable colors or the displayable number of the display lamps being different at least exists between the indication operations corresponding to any two indication signals.

In some implementation solutions, the device identification apparatus further includes:

a first acquiring module, configured to acquire unique identification information of each target device, and display all pieces of unique identification information;

a second receiving module, configured to receive a confirm instruction returned based on the unique identification information, and determine a designated device corresponding to the confirm instruction among the target devices; and a second acquiring module, configured to acquire gyroscope data and a signal intensity of the designated device, and perform a guidance operation on the designated device according to the gyroscope data and the signal intensity.

In some embodiments, the second acquiring module includes:

a first determining unit, configured to determine a device moving trajectory according to the gyroscope data, and determine signal intensities corresponding to different device positions in the device moving trajectory;

a second determining unit, configured to determine a distance between each device position and the designated device according to the signal intensity corresponding to each device position, and determine a relative position of the designated device according to the distance between each device position and the designated device; and a second generating unit, configured to generate indication information according to the relative position, and display the indication information.

Here, it needs to be noted that the instances and application scenarios implemented by the above modules and the corresponding steps are the same, but are not limited to the content disclosed in above examples. It needs to be noted that the above modules, as a part of the apparatus, may be implemented through software or hardware, and a hardware environment includes a network environment.

Figure 3:
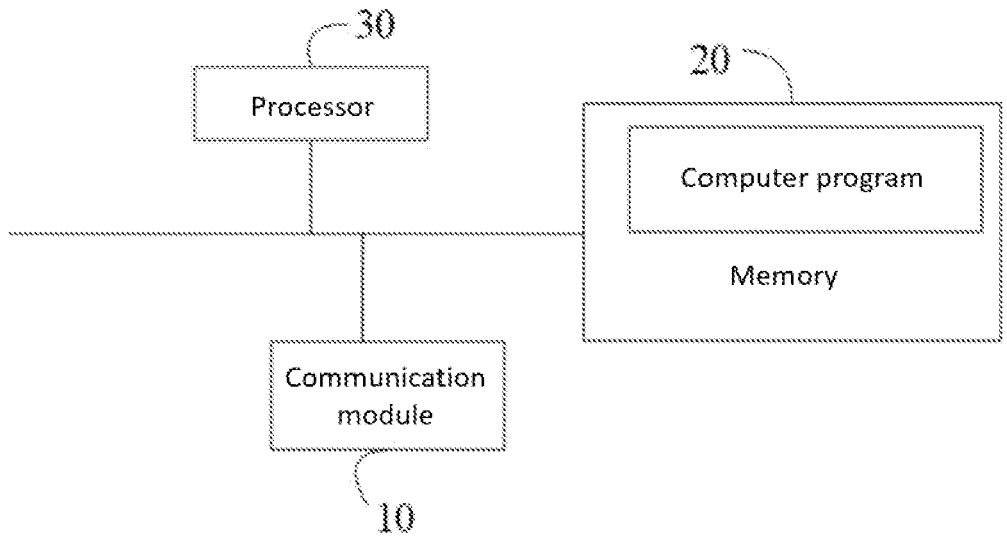
FIG. 3 is a schematic structural diagram of modules of an electronic device of an example of the present disclosure.

Referring to FIG. 3, an electronic device may include a communication module 10, a memory 20, a processor 30 and other components in terms of a hardware structure. In the electronic device, the processor 30 is connected with the memory 20 and the communication module 10 respectively, the memory 20 stores a computer program, which is executed by the processor 30 at the same time, and the computer program, when executed, implements steps of the method examples of the present disclosure.

The communication module 10 may be connected with an external communication device through a network. The communication module 10 may receive a request sent by the external communication device, and may also send requests, instructions and information to the external communication device, and the external communication device may be other electronic devices, servers or devices of Internet of Things, such as televisions.

The memory 20 may be configured to store a software program and various pieces of data. The memory 20 may mainly include a storage program area and a storage data area, the storage program area may store an operating system and an application required by at least one function (such as acquiring the device characteristic information corresponding to the identification instruction); and the storage data area may include a database, and may store data or information created according to the use of the system. In addition, the memory 20 may include a high-speed random access memory, and may further include a nonvolatile memory, such as at least one disk memory device, a flash memory device, or other volatile solid memory devices.

The processor 30 is a control center of the electronic device, uses various interfaces and lines to connect all parts of the whole electronic device, and executes various functions of the electronic device and processes data by running or executing a software program and/or module stored in the memory 20 and invoking data stored in the memory 20, so as to monitor the whole electronic device. The processor 30 may include one or more processing units, and in some embodiments, the processor 30 may integrate an application processor and a modem processor. The application processor mainly processes an operating system, a user interface, an application, and the like. The modem processor mainly processes wireless communication. It may be understood that, the modem processor may not be integrated into the processor 30.

Although not shown in FIG. 3, the above electronic device may further include a circuit control module, and the circuit control module is configured to be connected with a power supply to ensure normal working of other components. Those skilled in the art may understand that the structure of the electronic device shown in FIG. 3 constitutes no limitation to the electronic device, and it may include more or fewer components than those shown in the figure, or combine some components, or different component arrangements.

The present disclosure further provides a computer readable storage medium, storing a computer program thereupon. The computer readable storage medium may be the memory 20 in the electronic device in FIG. 3, and may also be at least one of a read-only memory (ROM)/random access memory (RAM), a magnetic disc and an optical disc, and the computer readable storage medium includes a plurality of instructions for enabling a terminal device (it may be a television, a car, a mobile phone, a computer, a server, a terminal, a network device or the like) with a processor to execute the method described in all examples of the present disclosure.

In the present disclosure, terms "first", "second", "third", "fourth" and "fifth" are only used for descriptive purposes and cannot be understood as indicating or implying relative importance. For those of ordinary skill in the art, the specific meanings of the above terms in the present disclosure may be understood according to specific situations.

In the description of this specification, referring to the description of the terms "one example", "some examples", "instance", "specific instance", "some instances" or the like, it means that specific characteristics, structures, materials or features described in conjunction with this example or instance are included in at least one example or instance of the present disclosure. In this specification, the schematic expressions of the above terms do not necessarily aim at the same examples or instances. Moreover, the specific characteristics, structures, materials or features described may be combined in an appropriate mode in any one or more examples or instances. In addition, those skilled in the art may joint and combine the different examples or instances described in this specification, as well as the features of different examples or instances, without mutual contradiction.

Although the examples of the present disclosure have been shown and described above, the scope of protection of the present disclosure is not limited to this. It may be understood that the above examples are exemplary and cannot be understood as limitations of the present disclosure. Those of ordinary skill in the art may make changes, modifications, and replacements to the above examples within the scope of the present disclosure, and these changes, modifications, and replacements should be covered within the scope of protection of the present disclosure. Therefore, the scope of protection of the present disclosure shall be subject to the scope of protection of the appended claims.

What is claimed is:

1. A device identification method, comprising:

receiving an identification instruction, and acquiring device characteristic information corresponding to the identification instruction;

determining a target device corresponding to the device characteristic information among connected devices; and sending an indication signal corresponding to the target device to the target device, so as to enable the target device to execute an indication operation corresponding to the indication signal, wherein the device identification method further comprises, after the step of determining the target device corresponding to the device characteristic information among the connected devices, the steps of:

acquiring unique identification information of each target device, and displaying all pieces of unique identification information;

receiving a confirm instruction returned based on the unique identification information, and determining a designated device corresponding to the confirm instruction among the target devices; and acquiring gyroscope data and a signal intensity of the designated device, and performing a guidance operation on the designated device according to the gyroscope data and the signal intensity, and wherein the gyroscope data is used for representing a device position and determining a device moving trajectory to determine signal intensities corresponding to different device positions in the device moving trajectory.

2. The device identification method of claim 1, wherein the receiving the identification instruction, and acquiring the device characteristic information corresponding to the identification instruction comprises:

receiving the identification instruction, and acquiring a device image of the target device according to the identification instruction; and identifying the device image to obtain the device characteristic information.

3. The device identification method of claim 1, wherein the sending the indication signal corresponding to the target device to the target device comprises:

judging whether one or a plurality of target devices are provided;

generating, in a case that the plurality of target devices are provided, an indication signal corresponding to each target device, wherein different indication signals correspond to different indication operations; and sending the indication signals to the corresponding target devices.

4. The device identification method of claim 3, after the sending the indication signals to the corresponding target devices, comprising:

acquiring a real-time image of each target device, and executing an indication identifying operation on the real-time image;

matching, in a case that the indication identifying operation identifies the indication operation, a current device corresponding to the indication operation among the target devices; and acquiring unique identification information of the current device, and displaying the unique identification information of the current device in a display position associated with the current device.

5. The device identification method of claim 3, wherein the generating the indication signal corresponding to each target device comprises:

acquiring the number of the target devices, and acquiring displayable colors and the displayable number of display lamps on the target devices; and generating a plurality of indication signals according to the displayable colors and the displayable number, and associating the indication signals with all the target devices respectively, wherein the number of the indication signals is the same as the number of the target devices, and the displayable colors or the displayable number of the display lamps being different at least exists between the indication operations corresponding to any two indication signals.

6. The device identification method of claim 1, wherein the performing the guidance operation on the designated device according to the gyroscope data and the signal intensity comprises:

determining the device moving trajectory according to the gyroscope data, and determining the signal intensities corresponding to different device positions in the device moving trajectory;

determining a distance between each device position and the designated device according to the signal intensity corresponding to each device position, and determining a relative position of the designated device according to the distance between each device position and the designated device; and generating indication information according to the relative position, and displaying the indication information.

7. An electronic device, comprising a memory, a processor and a computer program stored on the memory and capable of running on the processor, wherein the computer program is executed by the processor, and the processor is configured to:

receive an identification instruction, and acquire device characteristic information corresponding to the identification instruction;

determine a target device corresponding to the device characteristic information among connected devices; and send an indication signal corresponding to the target device to the target device, so as to enable the target device to execute an indication operation corresponding to the indication signal;

wherein the processor is further configured to:

acquire unique identification information of each target device, and display all pieces of unique identification information;

receive a confirm instruction returned based on the unique identification information, and determine a designated device corresponding to the confirm instruction among the target devices; and acquire gyroscope data and a signal intensity of the designated device, and perform a guidance operation on the designated device according to the gyroscope data and the signal intensity;

wherein the gyroscope data is used for representing a device position and determining a device moving trajectory to determine signal intensities corresponding to different device positions in the device moving trajectory.

8. The electronic device of claim 7, wherein the processor is further configured to:

receive the identification instruction, and acquire a device image of the target device according to the identification instruction; and identify the device image to obtain the device characteristic information.

9. The electronic device of claim 7, wherein the processor is further configured to:

judge whether one or a plurality of target devices are provided;

generate, in a case that the plurality of target devices are provided, an indication signal corresponding to each target device, wherein different indication signals correspond to different indication operations; and send the indication signals to the corresponding target devices.

10. The electronic device of claim 9, wherein the processor is further configured to:

acquire a real-time image of each target device, and execute an indication identifying operation on the real-time image;

match, in a case that the indication identifying operation identifies the indication operation, a current device corresponding to the indication operation among the target devices; and acquire unique identification information of the current device, and display the unique identification information of the current device in a display position associated with the current device.

11. The electronic device of claim 9, wherein the processor is further configured to:

acquire the number of the target devices, and acquire displayable colors and the displayable number of display lamps on the target devices; and generate a plurality of indication signals according to the displayable colors and the displayable number, and associate the indication signals with all the target devices respectively, wherein the number of the indication signals is the same as the number of the target devices, and the displayable colors or the displayable number of the display lamps being different at least exists between the indication operations corresponding to any two indication signals.

12. The electronic device of claim 7, wherein the processor is further configured to:

determine the device moving trajectory according to the gyroscope data, and determine the signal intensities corresponding to different device positions in the device moving trajectory;

determine a distance between each device position and the designated device according to the signal intensity corresponding to each device position, and determine a relative position of the designated device according to the distance between each device position and the designated device; and generate indication information according to the relative position, and display the indication information.

13. A non-transitory computer readable storage medium, storing a computer program thereupon, wherein the computer program is executed by a processor, the processor is configured to:

receive an identification instruction, and acquire device characteristic information corresponding to the identification instruction;

determine a target device corresponding to the device characteristic information among connected devices; and send an indication signal corresponding to the target device to the target device, so as to enable the target device to execute an indication operation corresponding to the indication signal;

wherein the processor is further configured to:

acquire unique identification information of each target device, and display all pieces of unique identification information;

receive a confirm instruction returned based on the unique identification information, and determine a designated device corresponding to the confirm instruction among the target devices; and acquire gyroscope data and a signal intensity of the designated device, and perform a guidance operation on the designated device according to the gyroscope data and the signal intensity;

wherein the gyroscope data is used for representing a device position and determining a device moving trajectory to determine signal intensities corresponding to different device positions in the device moving trajectory.

14. The non-transitory computer readable storage medium of claim 13, wherein the processor is further configured to:

receive the identification instruction, and acquire a device image of the target device according to the identification instruction; and identify the device image to obtain the device characteristic information.

15. The non-transitory computer readable storage medium of claim 13, wherein the processor is further configured to:

judge whether one or a plurality of target devices are provided;

generate, in a case that the plurality of target devices are provided, an indication signal corresponding to each target device, wherein different indication signals correspond to different indication operations; and send the indication signals to the corresponding target devices.

16. The non-transitory computer readable storage medium of claim 15, wherein the processor is further configured to:

acquire a real-time image of each target device, and execute an indication identifying operation on the real-time image;

match, in a case that the indication identifying operation identifies the indication operation, a current device corresponding to the indication operation among the target devices; and acquire unique identification information of the current device, and display the unique identification information of the current device in a display position associated with the current device.

17. The non-transitory computer readable storage medium of claim 15, wherein the processor is further configured to:

acquire the number of the target devices, and acquire displayable colors and the displayable number of display lamps on the target devices; and generate a plurality of indication signals according to the displayable colors and the displayable number, and associate the indication signals with all the target devices respectively, wherein the number of the indication signals is the same as the number of the target devices, and the displayable colors or the displayable number of the display lamps being different at least exists between the indication operations corresponding to any two indication signals.

18. The non-transitory computer readable storage medium of claim 13, wherein the processor is further configured to:

determine the device moving trajectory according to the gyroscope data, and determine the signal intensities corresponding to different device positions in the device moving trajectory;

determine a distance between each device position and the designated device according to the signal intensity corresponding to each device position, and determine a relative position of the designated device according to the distance between each device position and the designated device; and generate indication information according to the relative position, and display the indication information.

* * * * *